June 14, 1927.

J. H. BROWN 1,632,217

WAREHOUSE TRUCK BRAKE

Filed Sept. 11, 1925

INVENTOR
John H. Brown
BY William S. Gluck
ATTORNEY

Patented June 14, 1927.

1,632,217

UNITED STATES PATENT OFFICE.

JOHN H. BROWN, OF JERSEY CITY, NEW JERSEY.

WAREHOUSE-TRUCK BRAKE.

Application filed September 11, 1925. Serial No. 55,654.

This invention relates to warehouse trucks and more particularly to braking means to be used in combination therewith so as to provide a device particularly useful to longshoremen or warehouse men for transporting merchandise, such as packing boxes, cases, trunks and the like.

One of the objects of my invention resides in the provision of a warehouse truck or hand truck having means combined therewith, particularly the wheels thereof, affecting them so as to control their movement by braking, particularly in carrying loads downgrade, as where the objects are moved along a gangplank in loading or unloading vessels and the like.

The invention further has for its object the provision of controlling means for hand trucks affecting the same by braking the wheels thereof making possible the careful handling of loads carried thereby under conditions ordinarily involving difficulties of handling due to the momentum of the moving truck.

Hitherto brakes have been applied to warehouse or hand trucks operated by hand grip clutching means transmitting through the movement thereby imparted, the braking effect of the brake shoes to the wheels. I have found that though these devices operated satisfactorily for some purposes, there is required an uncomfortable and awkward movement of the hands for the application of the brakes to the wheels and the operator in such instances, thus lacks sufficient strength in his grip to apply the force necessary for producing the proper braking effect. This sort of control also is awkward in many positions in which the operator finds himself when wheeling or positioning the truck carrying the load, merchandise, packing boxes or the like due to the nature of the load or the grade or inclination of the run-way. The result is that efficient braking operation is not obtained when the truck is operated by hand grip, brake control. Such means are therefore deficient for universal positions and movement of the hand truck.

A further object of my invention therefore generally resides in the provision of a braking means for a hand truck which is put into operative engagement by a movement similar to that which is employed in moving the entire frame work of the truck and which is capable of being put into operative engagement in all positions, that the frame of the truck may be, and by a movement similar to that in bringing the truck to a rest position.

The invention further has for its object the provision of a hand truck and braking means in combination therewith which may be operated with the minimum of exertion of energy and the maximum amount of control.

For the attainment of these objects and such other objects as may hereinafter appear or be pointed out, I have illustrated embodiments of my invention in the drawings wherein.

Figure 1:
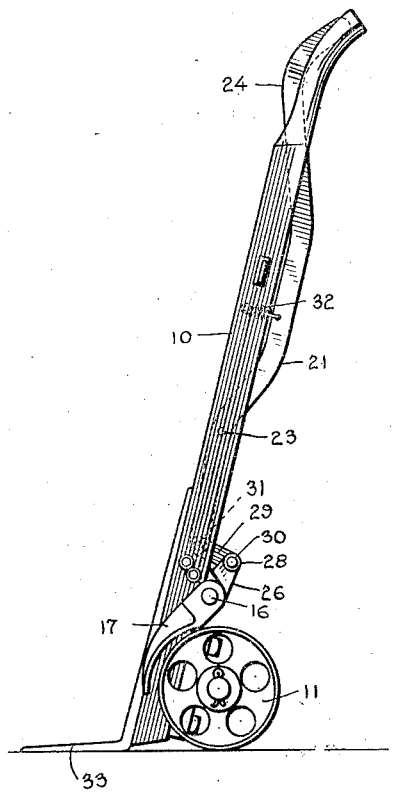
Fig. 1 is a side elevation of a truck having my improvement.
Figure 2:
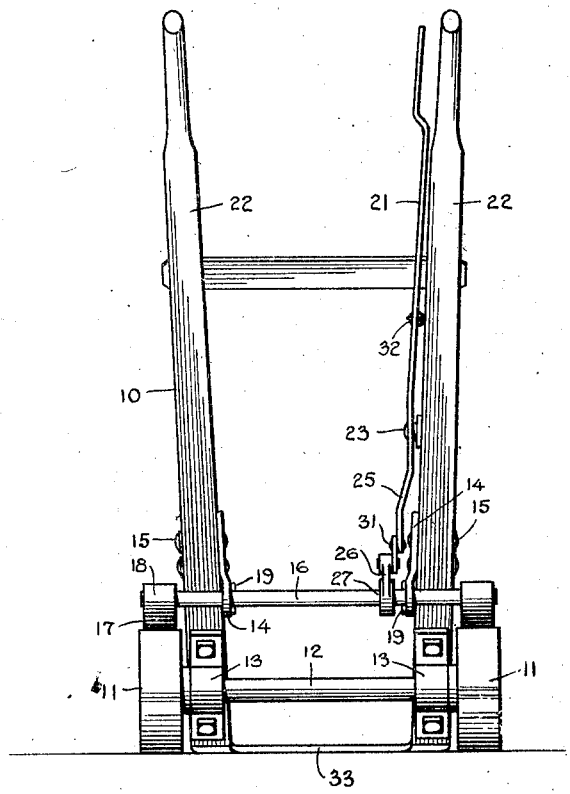
Fig. 2 is a rear view of the truck.

In carrying out my invention, I have illustrated the same in connection with a hand truck of the conventional type in which 10 is the frame proper having wheels 11 mounted on a cross shaft or axle 12 connected to the truck body in any suitable way as by bearing members, journals or hangers 13. My braking arrangement is attached thereto by extension members 14 attached to the truck frame in any suitable way as by bolts 15 and comprises a cross shaft 16 having at the extreme end thereof brake shoe arms 17 fixedly keyed or fastened at 18 for turning with the cross-shaft 16. Cross pins or the like 19 are provided for to prevent end play. For giving the cross shaft 16 pivotal movement necessary to apply brake shoes 20, I provide a longitudinal lever arm 21 positioned substantially parallel to the handle frame members 22 having a pivot or fulcrum portion 23 intermediate the length of the lever, the outer end thereof 24 forming the operating handle and the opposite end 25 forming the work arm.

To transmit pivotal movement through the cross shaft 16, I provide a crank arm 26 keyed to the shaft 16 at 27. The free end of this crank arm 26 has a bearing lug 28 which engages the work arm 25 of the longitudinal lever 21 by means of an interposed link 29 pivotally held into position by means of pins 30 and 31. There is also provided intermediate the power arm 21 of the longitudinal lever a coil spring 32 for maintaining the lever in the inoperative position.

From the construction thus described, it will be observed that the truck is used in the normal way by grasping the handle frame members 22 as by first positioning the frame in a substantially vertical position, the front bar 33 being pried underneath the object to be moved in the usual way. The handles and frame 22 may then be pivoted backward and downwardly on the wheels 11. In this position it will be observed that a pivotal motion may be imparted to the work arm 24 applying the brake by the transmission of a rocking motion through the drag link 29 connected to the cross shaft 16. This operation will lock the wheels preventing the truck frame moving away from the load. Thereupon release of the brake and further backward movement of the truck from the normal position will serve to mount the load upon the truck, whereupon the truck may be used in a normal way upon release of the operating member 24.

In conveying merchandise on the truck particularly in making any descent, as carrying a load downgrade such as the gangplank, the truck is usually moved to the necessary horizontal position by grasping handles 22. Bearing down on the work arm 24 will produce the necessary downward movement transmitting thereby through the power arm 25 and the interposed link 29, a pivotal movement to the crank arm 26 simultaneously applying the brake shoes 17 to the wheels 11 of the truck giving the necessary braking effect without the exertion of force other than that which would be used in shifting the position of the load for such movement.

However by a construction shown and the particular brake shoe as here provided, the foot of the operator may be used to apply the brake as by applying the same to the upper extremity of the crank arm 26 and as the longitudinal lever is connected permitting pivotal movement, it will not interfere with this manner of operation of the brake.

It will be observed that though I have described my brake operating mechanism in connection with a brake applied directly to the wheels of the truck, other forms of locking the wheels may be resorted to as where additional brake drums are provided in connection with wheels mounted on a shaft and though I have described my brake shoe shaft as operated by the longitudinal lever arm 21, through an interposed link 29, it will be observed that this link may be omitted and other means for transmitting the motion may be resorted to, provided that means are supplied for taking care of the differentially arcuate movement of the extremities of the crank arm 28 and work arm 25.

It will also be observed that by grasping the portion 24 and using it instead of one of the handles as in the normal use of the truck, the procedure necessary to bring the truck to the horizontal position also applies the brake shoes to the wheels preventing any unnecessary further movement and bringing the same to a standstill. This is all accomplished by a movement similar to that which is the natural one in operation of the truck and without shifting the application of force in any way. In this way, it will be observed that the control of the movement of the truck is obtained with great facility and ease and maximum possible application of force. Also the arm 24 is capable of use alternately as the truck handle and serves to operate efficiently in this respect for all purposes at the same time giving instant control of the brake should the same be desired to be put into operation.

Having thus described my invention and illustrated its use, what I claim as new and desire to secure by Letters Patent is:

1. In combination with a hand truck having a longitudinally disposed frame and handles and brake members for the wheels thereof, operating means for said brake members comprising a longitudinally disposed lever arm substantially parallelly arranged for the full length of said truck frame, said lever arm being so shaped and pivotally connected in relation thereto that the braking members may be put into operation by a downward movement of the lever arm.

2. In combination with a hand truck having a longitudinally disposed frame and handles, of braking means therefor comprising a cross shaft pivotally mounted thereon carrying brake shoes capable of engaging the wheels of the truck, a crank arm disposed on said cross shaft and an operating member comprising a longitudinally disposed lever arm substantially parallel to said truck frame and handles, said lever arm being pivotally mounted in relation to said truck frame near the wheels thereof whereby the brake shoes are put into engaging relation by a downward movement of the lever arm, said lever arm terminating at its upper extremity in a handle portion comprising an auxiliary handle for the truck.

3. In combination with a hand truck having a longitudinally disposed frame and handles, of braking means therefor comprising a cross shaft pivotally mounted thereon carrying brake shoes capable of engaging the wheels of the truck, a crank arm disposed on said cross-shaft and an operating member for said cross shaft connected with said crank arm by an interposed link, said operating member comprising a longitudinally disposed lever arm substantially parallel to said truck frame and handles, said lever arm being pivotally mounted in relation to said truck frame whereby the brake shoes are put into engaging relation by a downward movement of the lever arm, said lever arm terminating at its upper extremity in a handle portion comprising an auxiliary handle for the truck, separate from the handles proper, whereby pivotal movement and braking power may be simultaneously imparted to the truck.

In witness whereof, I have signed this specification.

JOHN H. BROWN.